UNITED STATES PATENT OFFICE.

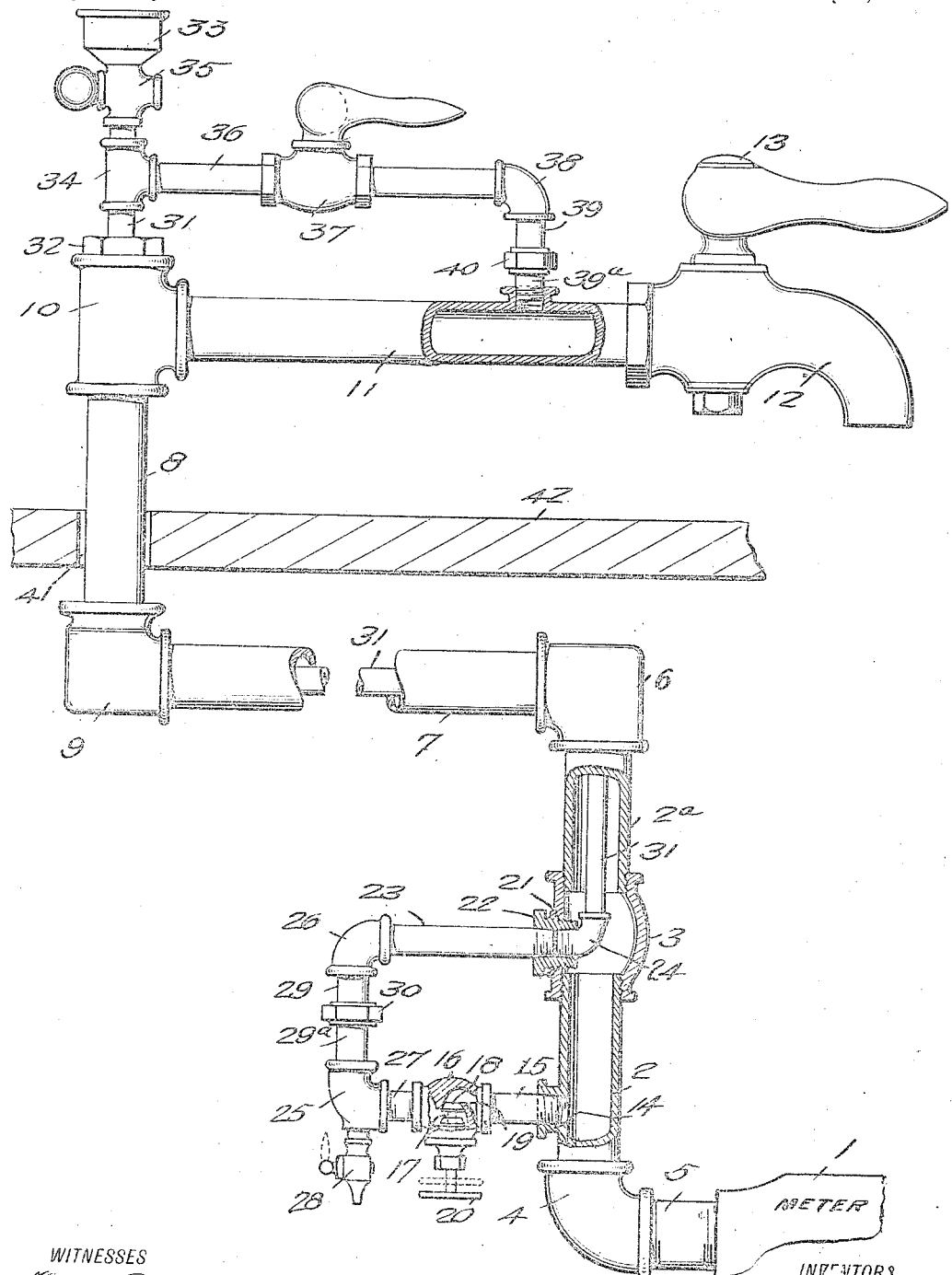

THOMAS C. WILKES AND SELDEN E. PHILLIPS, OF JACKSON, MICHIGAN.

WATER SYSTEM.

1,115,139. Specification of Letters Patent. Patented Oct. 27, 1914.

Application filed June 2, 1914. Serial No. 842,404.

*To all whom it may concern:*

Be it known that we, THOMAS C. WILKES and SELDEN E. PHILLIPS, citizens of the United States, and residents of Jackson, in the county of Jackson and State of Michigan, have invented a new and useful Improvement in Water Systems, of which the following is a specification.

Our invention is an improvement in water systems, and has for its object to provide a system of the character specified, so arranged that water may be drawn from the main at all times regardless of temperature conditions, and regardless of whether or not the usual conduit pipe is frozen.

In the drawing is shown a side view of the improved system with parts in section.

The water passes from the meter indicated at 1 to a vertical pipe consisting of upper and lower sections 2 and 2ᵃ, which are separated by a T 3. The adjacent ends of the pipe sections 2 and 2ᵃ are connected to the ends of the T and the lower end of the section 2 of the pipe is connected by an elbow 4, and a section 5 of pipe to the meter. The upper end of the section 2ᵃ of the vertical pipe is connected by means of an elbow 6, with one end of a pipe 7, and the other end of the pipe 7 is connected to a vertically arranged pipe 8, by means of an elbow 9. The pipes 2—2ᵃ, 7 and 8 are of large diameter, and a T 10 is connected with the upper end of the pipe 8.

A delivery pipe 11 leads from the lateral branch of the T, and the outer end of the pipe 11 is provided with a valve casing 12, the valve indicated at 13 controlling the discharge of water from the pipe 11. The pipe 11 is also of large diameter, corresponding to the pipes 2—2ᵃ, 7 and 8. A T 14 is provided in the pipe section 2, near its lower end, and a section 15 of small pipe is threaded into the T.

A valve casing 16 is connected with the outer end of the pipe section 15, and the valve 17 of the casing coöperates with a seat 18 in the transverse partition 19 of the valve casing, for controlling the flow of water through the casing. The valve is operated by a wheel 20, connected with the stem in the usual manner. An opening 21 is provided in the wall of the union 3, and a bushing 22 is threaded into the opening. The bushing forms a union for connecting a section of pipe 23 with an elbow 24 arranged within the bushing, and the pipe section 23 is parallel with the pipe section 15.

An elbow 25 is indirectly connected with the adjacent end of the valve casing 16, by means of a short section of pipe 27, and the elbow has a drain valve 28, connected therewith and discharging downwardly. An elbow 26 is connected with the outer end of the pipe 23, and the elbows 25 and 26 are connected by pipe sections 29 and 29ᵃ, and by means of a union 30. A pipe 31 leads from the elbow 24 within the union 3, through the pipes 7 and 8, and the elbows 6 and 9 and the T 10, to a point above the upper end of the T 10, and a bushing 32 encircles the pipe at the upper end of the T. A receptacle 33 is connected with the upper end of the pipe 31, by means of a T 34, and a valve 35 is provided in connection with the receptacle for controlling the communication between the pipe and the pipe 31.

A pipe section 36 is connected with the lateral branch of the T 34, the said pipe 36 extending approximately parallel with the pipe 11 and above the same, and a valve casing 37 is interposed in the length of the pipe 36, for controlling the communication therethrough. The outer end of the pipe 36 is connected to the pipe 11, near the discharge valve 12, by means of an elbow 38 and pipe sections 39 and 39ᵃ, which are connected by a union 40. The pipe section 39 is connected with the elbow 38, while the pipe section 39ᵃ is tapped into a T in the upper side of the pipe 11.

The operation of the improved device is as follows: The pipe 8 passes through an opening 41, in the floor 42, and the pipe 11 and the discharge valve casing 12 are arranged above the floor. In the ordinary course service water would be drawn from the valve 13, the water passing from the meter by way of the pipes 2, 2ᵃ, 7, 8 and 11 to the discharge valve casing. With the valves 17 and 37 open the water may also pass by way of the pipes 15—27, 29—29ᵃ, 23, 31 and 36 to the pipe 11. With the valve 17 closed however, and the valve 28 open, the small pipe may be drained, the valve 35 being open to permit thorough drainage. In case that water should freeze in the large or outer pipe, by closing the valve 28 and opening the valves 17, 37 and 13, the water will flow from the meter by way of the pipes 15, 23 and 31 to the pipe 36 and to the discharge valve 13, and the flowing water will tend to thaw the ice in the outer pipe. If it is desired to thaw the ice by hot water it is only necessary to open the valve 35, close the valve 17 and open the valve 28, thus permitting the hot water to flow from the receptacle through the pipe 21 and the pipes 23 to discharge at the valve 28.

The invention consists in arranging within the large outer pipe used for conducting the water, a small pipe, the small pipe extending out of the large pipe at one end and having a portion of its length at the other end outside of the large pipe, the said portion being provided with a discharge valve, and with another valve for closing the communication between the large pipe at the adjacent end and the discharge valve. Both ends of the small pipe are accessible, considering the drain valve 28 as the one end and by inserting the pipe 15—27 and the valve casing 16, the large pipe is tapped below the freezing point. With the pipes arranged as specified, running water may be had whatever the temperature. The valves 17 and 37 should be closed and the valve 28 opened when not in use in freezing weather.

We claim:—

1. In combination with the service pipe connected to the meter at one end and having a discharge valve at the opposite end, of a pipe of less diameter arranged partly within the service pipe, the service pipe having vertical portions adjacent to the discharge valve and adjacent to the meter, the upper end of the small pipe extending through the upper end of the vertical portion adjacent to the discharge valve and having a lateral branch above the said vertical portion and a receptacle above the branch, a valve for controlling the communication between the receptacle and the small pipe, a pipe leading from the lateral branch and opening into the discharge pipe near the discharge valve, a valve interposed in the said last-named pipe for closing the communication through the same, said small pipe extending laterally through the wall of the service pipe at the vertical portion adjacent to the meter, a downwardly extending discharge pipe connected with the lateral extension and provided with a discharge valve at its lower end and with a lateral outlet above the discharge valve, a pipe leading from the lateral outlet and communicating with the vertical portion of the service pipe adjacent to the meter, and a valve interposed in the said pipe.

2. In combination with the service pipe connected to the meter at one end and having a discharge valve at the opposite end, of a pipe of less diameter arranged partly within the service pipe, said small pipe extending beyond the service pipe at its upper end and having a lateral branch communicating with the service pipe near the discharge valve, a valve for controlling the lateral branch, a receptacle connected with the upper end of the small pipe above the lateral branch, a valve between the receptacle and the small pipe, the small pipe extending outside of the service pipe near the meter and then extending into the service pipe near the meter, and having a discharge valve at its lowest portion, and a valve interposed between the last-named discharge valve and the service pipe.

3. In combination with the service pipe connected to the meter at one end and having a discharge valve at the opposite end, of a pipe of less diameter arranged partly within the service pipe, said small pipe extending beyond the service pipe at its upper end and having a lateral branch communicating with the service pipe near the discharge valve, a receptacle connected with the upper end of the small pipe above the lateral branch, the small pipe extending outside of the service pipe near the meter and then extending into the service pipe near the meter and having a discharge valve at its lowest portion, and a valve interposed between the last-named discharge valve and the service pipe.

4. In combination with the service pipe connected to the meter at one end and having a discharge valve at the opposite end, of a pipe of less diameter leading from the service pipe near the meter and opening into the service near the discharge valve and having a portion intermediate its ends arranged within the discharge pipe, a valve in the said pipe between each end and the portion within the service pipe, and means between the end of the said pipe adjacent to the discharge valve and the portion within the service pipe for admitting liquid to the said pipe.

THOMAS C. WILKES.
SELDEN E. PHILLIPS.

Witnesses:
CHARLES JAMES WATERS,
CLIFFORD A. DEAN.